Oct. 31, 1933.    G. F. JOHNSON    1,933,061
COTTON PLANTER
Filed March 15, 1930
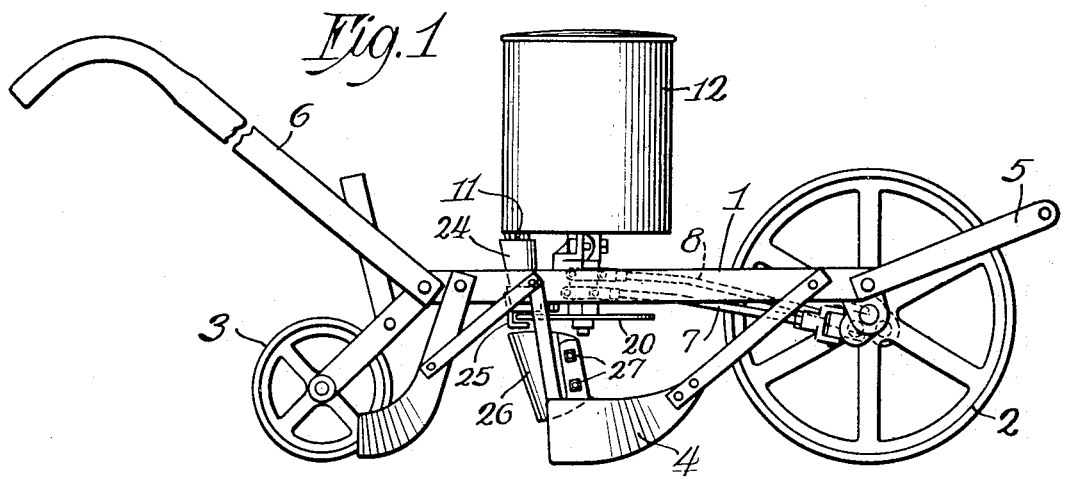
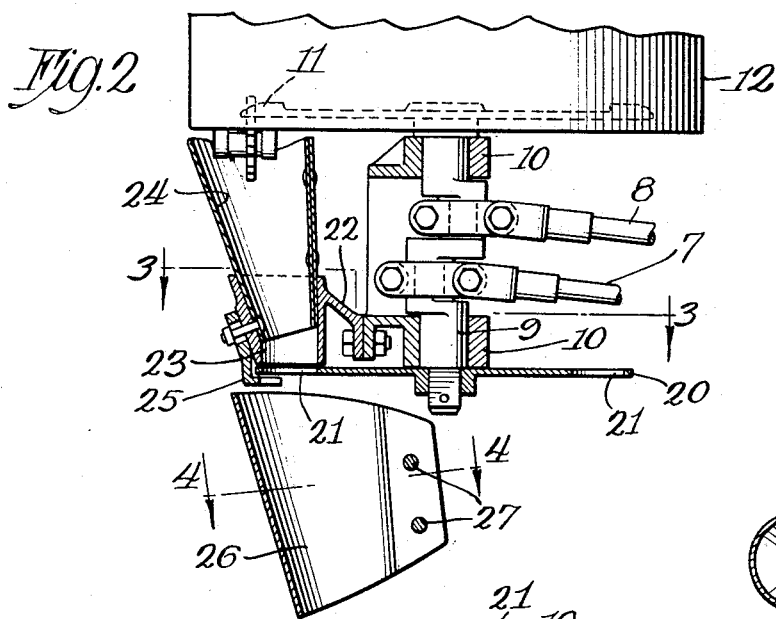
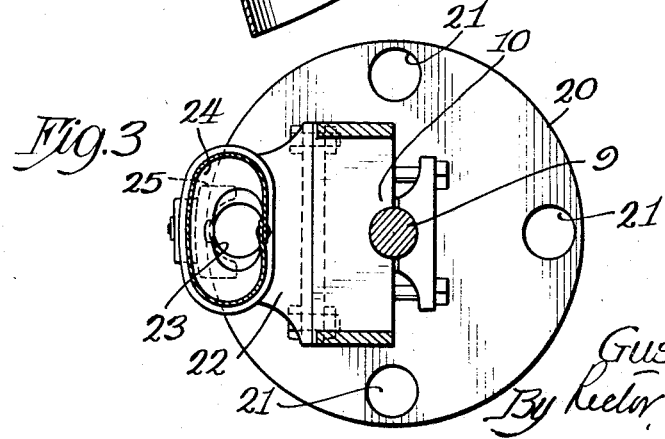
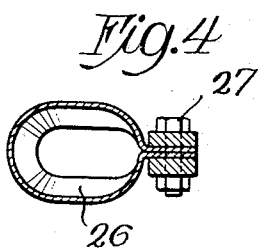
Inventor
Gustaf F. Johnson Patented Oct. 31, 1933

1,933,061

UNITED STATES PATENT OFFICE 1,933,061

COTTON PLANTER

Gustaf F. Johnson, Rock Island, Ill., assignor to Minneapolis-Moline Power Implement Company, Moline, Ill., a corporation of Delaware Application March 15, 1930. Serial No. 436,133

9 Claims. (Cl. 111—77)

This invention relates to a cotton planter.

It has been customary for many years to plant cotton by drilling in rows, that is, as the planter goes across the field there is an almost continuous stream of cotton seed going down through the chute into the ground. When the plants start coming up, men go through the field with hoes and chop out many of the growing plants leaving two or three plants every twelve or eighteen inches. An effort is made to leave the strong plants and eliminate the weak ones. This plan is wasteful of cotton seed and not always satisfactory as to the position of the strong plants, but it is the one that has been considered practical and this plan has been followed almost universally for years.

Corn planters which drop seeds in bunches at predetermined distances apart are, of course, well known, but the difficulty with planters of this kind for planting cotton is that they bunch the seeds too close together so that the cotton plants grow up so close to one another that it is very difficult, if not impossible, to thin out the hills without disturbing all the plants. Furthermore, cotton hills are much closer together than corn, the distance for cotton being about twelve or eighteen inches while the distance for corn is about thirty six inches. If a corn planter is used having a mechanical valve mechanism, the closeness together of the cotton hills makes it necessary to operate the valve mechanism very rapidly. This movement is, in fact, so fast that it is difficult to make a valve mechanism that will work accurately and at the same time be durable.

The present invention is directed to a solution of this problem and it comprehends planting the cotton seeds in what may be termed "scattered bunches" that is, while the seeds will be grouped they will not be closely bunched together. The invention is shown as it is embodied in an attachment for a cotton planter, but it need not necessarily be made as an attachment.

The general object of the invention is to provide an improved cotton planter.

A more particular object is to provide a cotton planter that will plant cotton seeds in bunches with the individual seeds scattered a substantial distance apart.

A still further object is to provide an attachment that may be readily attached to standard planters to cause them to drop cotton seeds in the manner described.

Other objects and advantages of the invention will appear from the following specification and drawing.

An embodiment of the invention is shown in the accompanying drawing in which:

Fig. 1 is a side elevation of a planter embodying the invention.

Fig. 2 is a partial sectional side elevation showing particularly the mechanism used for bunching the cotton seeds.

Fig. 3 is a section on the line 3—3 of Fig. 2.

Fig. 4 is a section on the line 4—4 of Fig. 2.

The invention is illustrated in connection with a simple type of planter having a frame 1 supported at its front end by a ground wheel 2 and at its rear by a small trailing wheel 3. Supported beneath the frame is a shoe 4 for opening up the furrow in which the seed is planted. The planter is pulled through a draft connection 5 and guided by means of handles 6.

Rotation of the front ground wheel 2 operates two pitmen 7 and 8 which rotate a vertical shaft 9 journaled in suitable bearings 10 on the frame as shown in Fig. 2. This shaft rotates a seed discharging mechanism 11 in the bottom of a seed receptacle or can 12. This mechanism is shown only diagrammatically as an understanding of its details is not necessary for an understanding of the present invention. Any suitable mechanism may be employed.

The embodiment of the invention shown in the present application is in the form of an attachment that can be applied to a standard form of planter such as above described without changing the construction of the latter.

This attachment includes a circular plate 20 having a number of relatively large holes 21 near its periphery, four of such holes being shown in the plate illustrated in Fig. 3. This plate is detachably mounted on the end of the planter shaft 9 to rotate with it.

Detachably attached to the bearing 10 is a bracket member 22, the outer end of which is in the form of a spout 23. The lower end of this spout is positioned closely adjacent the top of the plate 20 as illustrated in Fig. 2, and in a position such that the holes 21 and plate 20 may be brought into register with it as the plate is rotated. The spout has an upward extension 24 positioned immediately beneath the seed discharging mechanism 11 so as to receive the seed as it is discharged by said mechanism. A small angle member 25 is clamped to the spot 23, said member projecting under the circular plate 20 to assist in guiding said plate and in holding it adjacent the spout 23 during the rotation of the plate.

Positioned beneath the revolving plate 20 and in line with the spout 23 is a discharge chute 26 that is detachably clamped to the shoe 4 by bolts 27.

The few simple parts above described are all that are needed to combine with an ordinary planter to achieve the valuable results herein disclosed.

The operation is as follows:

As the planter moves through a field the ground wheel 2 rotates the shaft 9 and the discharge mechanism 11 within the can 12 discharges an almost continuous stream of cotton seed into the chute 24—23. This seed falls onto the plate 20 where it remains while said plate is rotating. The seed is held against movement with the plate by the spout 23. As one of the large holes 21 in plate 20 begins to register with the spout 23 the seeds are discharged into the large discharge chute 26, but the seeds are not all dropped together as a close bunch. As the edge of the hole 21 reaches discharge position, a few seeds drop first and the remainder follow as the hole registers more completely with spout 23. These seeds drop into the furrow behind the shoe 4 in a scattered group or bunch. When the seeds grow, the plants are in hills but the individual plants are somewhat scattered.

The number and the spacing of these hills can, of course, be varied by varying the number of holes in the plate 20, or by varying its speed of revolution.

It will be understood that the construction shown is for purposes of illustration only and that variations may be made in it without departing from the spirit and scope of the invention as defined by the appended claims. It need not be built as an attachment. Instead it can be embodied in a planter in which event the details would be slightly different though the principle would remain the same.

I claim:

1. A cotton planter having a receptacle for receiving cotton seed, a ground wheel, a furrow opener, mechanism actuated by power derived from rotation of said ground wheel for discharging seeds from said receptacle, means operated by power derived from said ground wheel for collecting said discharged seeds in loose bunches, and means for automatically discharging said loose bunches and guiding them into the furrow opened by said furrow opener.

2. A cotton planter having a receptacle for receiving cotton seed, means for discharging seed from said receptacle in a continuous manner, a rotatable plate upon which said seed is discharged, means for rotating said plate, means preventing the discharged seed from rotating with said plate, said last named means being of such size as to loosely hold said discharged seed on said plate, said plate having openings therein which periodically register with said holding means, said openings being of such size that when they register with said holding means the seed is discharged in loose bunches.

3. A cotton planter having a receptacle for receiving cotton seeds, a rotatable plate having relatively large, spaced openings therein, said plate being mounted to rotate in a substantially horizontal plane, a stationary spout having one of its ends terminating closely adjacent the top of said plate, means for discharging seed from said receptacle into said spout and onto the top of said plate, and means for rotating said plate to periodically bring its openings into registry with said spout to enable the seeds collected on said plate to be discharged in loose bunches.

4. A cotton planter having a receptacle for receiving cotton seeds, a rotatable plate having relatively large, spaced openings therein, said plate being mounted to rotate in a substantially horizontal plane, means for discharging cotton seeds from said receptacle onto the top of said plate in a substantially continuous manner, means immediately above said plate for holding said seed against moving with said plate as it is rotated, and means for rotating said plate to periodically bring the openings therein into registry with said holding means to permit the collected seeds to be periodically discharged in bunches with the individual seeds of each bunch scattered.

5. A cotton planting attachment for planters that have a seed receptacle and means for discharging seed from said receptacle in a substantially continuous manner, comprising a support adapted to be detachably attached to said planter without changing the construction of the latter, means carried by said support for collecting said continuously discharged seeds and grouping them into loose bunches, separately readily attachable and detachable means for periodically discharging said bunches, and separately readily attachable and detachable means for guiding the discharged bunches to planting position.

6. A cotton planting attachment for planters that have a seed receptacle, a seed discharging mechanism operated by a rotatable shaft for discharging seed from said receptacle in a substantially continuous manner, and a furrow opener; comprising means adapted to be readily attached to and detached from said planter for collecting said continuously discharged seeds and grouping them into loose bunches, means readily attachable to and detachable from said shaft for automatically and periodically discharging said loose bunches, and means readily attachable to and detachable from said furrow opener for guiding said discharged bunches to planting position.

7. An attachment for cotton planters that have receptacles for cotton seed and means for discharging the seed from the receptacle including a rotatable shaft, comprising a plate adapted to be attached to and to rotate with said shaft, said plate having openings therein, and a spout-like member adapted to be positioned between said receptacle and said plate, said spout terminating closely adjacent said plate and being positioned so that, as said plate is rotated, the openings therein will register periodically with said spout.

8. An attachment for corn planters that have a receptacle for cotton seed and a discharge mechanism operated by a rotatable shaft, comprising a circular plate adapted to be attached to said rotatable shaft and to rotate therewith, said plate having a plurality of openings near its periphery, and a spout adapted to be attached to said planter and positioned between said receptacle and said plate, the lower end of said spout being positioned immediately above said plate to hold seeds discharged into it against movement with said plate, the openings in said plate being adapted to register with said spout as the plate is rotated whereby the seed on the plate is periodically discharged in loose bunches.

9. The combination with a cotton planter having a receptacle for receiving cotton seed and a discharging mechanism for discharging seed from said receptacle in a continuous manner, of an attachment comprising a rotatable plate for receiving said discharged seed, means for rotating said plate, a spout between said receptacle and plate, the lower end of said spout being positioned adjacent said plate and being of such size as to loosely hold said discharged seed against rotation with said plate, said plate having openings therein that periodically register with said chute, said openings being of such size that when they register with said chute the collected seeds will be discharged in loose bunches.

GUSTAF F. JOHNSON.